United States Patent

[11] 3,542,382

[72] Inventor Foster M. Hagmann
 Los Angeles, California
[21] Appl. No. 724,469
[22] Filed April 26, 1968
[45] Patented Nov. 24, 1970
[73] Assignees Susan S. Monselle,
 a part interest,
 Amanda D. Lang,
 a part interest, Marlene A. Hagmann, a
 part interest, and Waldron A. Easton,
 a part interest

[54] SEAL
 17 Claims, 7 Drawing Figs.
[52] U.S. Cl. .................................................. 277/211,
 277/180, 277/235, 285/363
[51] Int. Cl. ..................................................... F16j 15/02
[50] Field of Search............................................ 277/208-
 —211, 235, 235B, 235A, 180; 285/363—368

[56] References Cited
 UNITED STATES PATENTS
1,843,297  2/1932  Oven........................... 277/235BUX 2,513,178  6/1950  Jackson........................ 277/211UX
3,053,544  9/1962  Gorsica ........................ 277/209X
3,352,564  11/1967 Johnson ....................... 277/235X
 FOREIGN PATENTS
1,057,861  2/1967  Great Britain................ 277/235B Primary Examiner—Laverne D. Geiger
Assistant Examiner—Jeffrey S. Mednick
Attorney—Fulwider, Patton, Rieber, Lee & Utecht ABSTRACT: A seal embodying a ringlike retainer with, in cross section, a central web and resistibly deformable ridges at the inner and outer peripheries of the web. The retainer defines a pair of oppositely facing grooves that receive in confining relationship a pair of deformable sealing elements. The volumes of the elements are initially less than the voids of their respective grooves and the resistance to deformation of the elements is less than that of the ridges. During seal installation, the ridges are flattened out under pressure and the voids of the grooves are progressively reduced until they are substantially equal to the volumes of their respective elements, and the elements are forcefully urged into sealing contact with the faces of the parts.

Patented Nov. 24, 1970
3,542,382
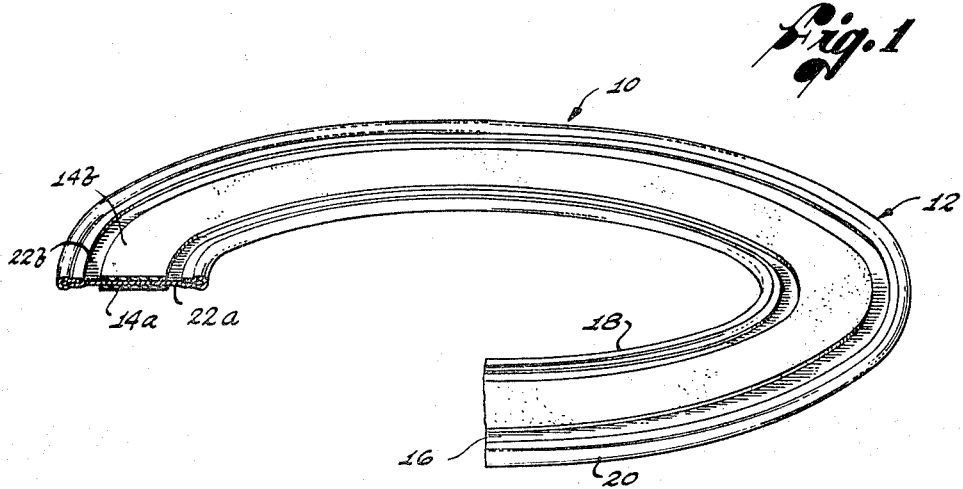
Fig.1
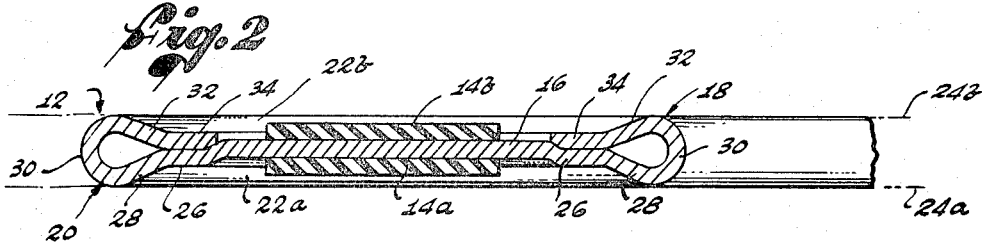
Fig.2
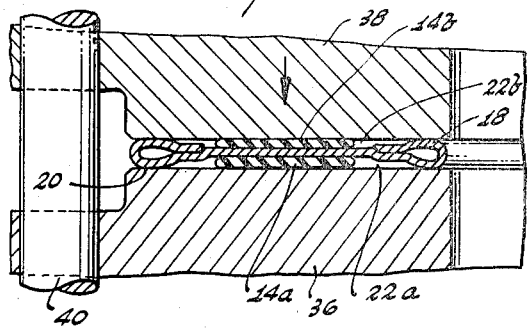
Fig.3
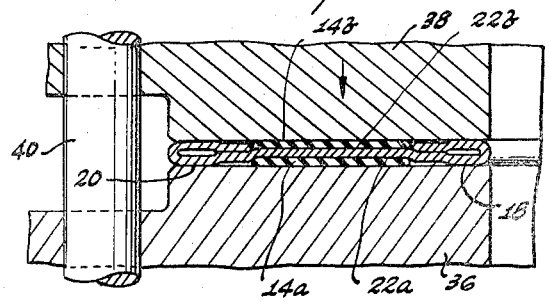
Fig.4
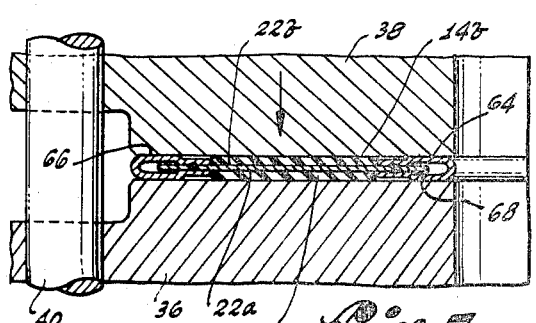
Fig.7
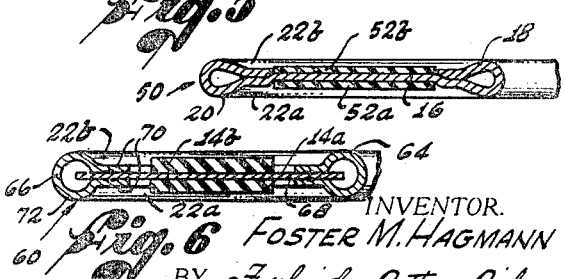
Fig.5
Fig.6
INVENTOR.
FOSTER M. HAGMANN
BY Fulwider, Patton, Rieber,
Lee, and Utecht
ATTORNEYS

SEAL

BACKGROUND OF THE INVENTION

This application relates to a seal and, more particularly, to an improved seal of the type adapted for sealing the interface between mating parts.

In the past, various types of seals have been used in applications where it is desired to seal the interface between mating parts. One type of seal has a groove in one of the parts that receives a separately formed O-ring. The O-ring seal is subject to many significant disadvantages. To begin with, in order to achieve sealing, it is necessary to control the volumetric relationship between that of the O-ring and the void of the groove. Even if this is done, problems occur because of normal manufacturing tolerances. Possible tolerance conditions, e.g., an oversize groove and an underside O-ring, may result in such a disparity between the volume of the O-ring and the void of the groove that effective sealing cannot be achieved. A characteristic of O-ring sealing is that it depends upon the resilience or "memory" of the O-ring. If this resilience is lost, as will occur after a period of use, the seal fails.

Even if satisfactory sealing can be achieved with an O-ring, expensive machining operations, closely controlled inspection techniques and other inherently expensive manufacturing procedures are required. The result is that the cost of the seal is relatively high.

Another more satisfactory method of sealing has involved molding rubber sealing elements in place in a grooved retainer member. While this makes it possible to overcome the adverse tolerance condition inherent in O-ring sealing and affords other advantages, it still involves relatively costly manufacturing procedures.

In an effort to cut costs, various attempts have been made in the past to use flat gaskets formed of plastics, or the like. These materials have particular advantage in sealing in that they are noncorrosive and noncontaminating, as well as impermeable to most all liquids and gases. Many of these materials also are readily deformable so that they are capable of conforming to surface irregularities in the parts to be sealed.

Needless to say, a flat gasket is much less expensive than seals of the types previously described, which have retainers with machined grooves. Notwithstanding these significant advantages, it has not been possible to use these materials in a flat gasket seal because of their tendency to extrude or cold flow when subjected to pressure. As force is applied to bring mating flanges together, a gasket formed of these plastics will shift laterally or cold flow, thus precluding effective sealing from being achieved. Because of the nature of a flat gasket seal, the entire load imposed by the mating flanges is carried by the gasket. Even if sealing is achieved initially, cold flow will continue over a period of time, so that the seal will eventually fail. Moreover, in time, the material, like that of an O-ring, will take a permanent set or lose its resiliency. Thus, any ability it may have had to respond to flange separation is lost.

SUMMARY OF THE INVENTION

The present invention provides a ringlike retainer member having, in cross section, a central web and resistibly deformable ridges at the inner and outer peripheries of the web. These means forming ridges define the boundaries of a continuous seal-confining groove. Disposed within the groove is a sealing element formed of a deformable sealing material, preferably a resilient deformable rubber or plastic. To insure that the ridges serve to confine the sealing element within its groove, the resistance to deformation or flattening of the ridges is made greater than that of the element.

The volume of the sealing element is initially somewhat less than the void in the groove. With this arrangement, as closing force is applied, the ridges resistible flatten out, thereby reducing the effective void of the groove until it substantially equals the volume of the sealing element. When this condition is achieved, maximum sealing pressure is exerted, since sealing materials such as plastics and rubbers are incompressible.

In the illustrative embodiment, the retainer member is shaped to define a pair of seal-confining grooves in back-to-back relationship and bands of the elements are disposed in such relationship within their grooves. This enables sealing to be achieved against both faces of mating parts. The seal of the invention is especially adapted for use in this type of application.

It is preferred that the ridges be configured so as to have at least some spring-back capability when they are flattened out during installation. Use of a retainer member with such ridges enables the seal to respond to separation of the mating parts, as is often encountered in practice, and still maintain effective sealing.

DESCRIPTION OF THE DRAWING

These and other objects, features, and advantages of the invention will be better understood by referring to the following detailed description, taken in conjunction with the accompanying drawing in which:

FIG. 1 is a perspective view of a seal constructed in accordance with the invention, a portion being broken away and removed to show the cross-sectional configuration;

FIG. 2 is a sectional view on an enlarged scale of the part shown in FIG. 1;

FIG. 3 is a sectional view, similar to FIG. 2, illustrating the seal partially installed between opposing flanges;

FIG. 4 is a view similar to FIG. 3, except that full closing force has been applied to the flanges;

FIG. 5 illustrates in section another embodiment of the seal of the invention;

FIG. 6 illustrates in section still another embodiment; and

FIG. 7 is a sectional view, similar to FIG. 4, showing the seal of FIG. 6 fully installed.

DESCRIPTION OF PREFERRED EMBODIMENTS

Referring to the drawing and to FIGS. 1 and 2 in particular, numeral 10 designates an annularly shaped seal constructed in accordance with the invention. It may be seen to include a metal retainer 12 and a pair of deformable sealing elements 14a and b mounted on the retainer in back-to-back relationship.

The retainer 12 is integrally formed of a malleable material, such as sheet metal, which is capable of being configured into the desired shape. As may be seen in FIG. 2, the retainer 12 has, in cross section, a central annular web 16 with resiliently deformable and generally tear-shaped ridges 18 and 20 at its inner and outer peripheries, respectively. In order to enable the ridges to deform or flatten out during seal installation, the ridges have a vertical thickness, i.e., in a direction perpendicular to the plane of the web 16, greater than the thickness of the web itself. The ridges 18 and 20 cooperate with the web 16 to define oppositely facing grooves 22a and b. The void of each of the grooves 22a and b is considered to be the space (area in cross section) above or below the planes of the respective reference lines 24a and b in FIG. 2.

For optimum results, it is desired that the ridges 18 and 20 have some spring-back capability. Use of a resilient, flexible material, such as sheet metal, to form the retainer 12 affords this advantage.

In order that the grooves 22a and b be of approximately the same depth, each of the ridges 18 and 20 is formed by a first section 26 that is stepped slightly downwardly from the web. The section 26 in turn joins, in series, a downwardly sloping section 28, an arcuate section 30 that turns back toward the web 16, a downwardly sloping section 32 and, finally, a terminal section 34 that seats in flush-face engagement with the section 26. Thus, the sheet metal forms a loop along each edge of the web, offset in both directions from the plane of the web.

The sealing elements 14a and b here comprise continuous, annular flat bands of deformable sealing material disposed within the grooves 22a and b and, for convenience of handling, attached to the opposite sides of the web 16. The resistance to deformation of the sealing elements is less than that of the ridges. Preferably the elements are formed of a resilient, deformable plastic or rubber of the types which have known advantages in sealing applications. It is desired that the material be noncorrosive and noncontaminating and, in some applications, capable of withstanding high temperatures. Examples of materials which may prove highly satisfactory, depending upon the application, are the classes of plastics known as vinyl polymers and copolymers, urethanes, olefins and certain epoxy resins, and rubbers.

As may be seen in FIGS. 1 and 2, the sealing elements initially have volumes (cross-sectional areas) less than the volumes or voids (cross-sectional areas) of their respective grooves. Because of this volume-void relation, the elements are capable of being confined within their grooves and, as will be developed, this confinement is maintained at all times during installation and use. This important feature of the seal of the invention enables it to effectively use plastics having no appreciable resilience, but other desirable properties, as a sealing material.

It is advantageous from a cost standpoint that the elements 14a and b be formed as flat bands, as shown in the drawing. In particular, this enables them to be stamped in any desired overall shape, circular or otherwise, from flat sheet material. In this connection, it may be desirable to shape the elements 14a and b in such a way as to further enhance sealing and, when so shaped, they may even initially project from their respective grooves 22a and b. The sealing elements 14a and b embodied in the seal 10 initially are narrower in width than the respective grooves 22a and b and herein are of approximately the same thickness as the initial depth of the grooves, preferably having thicknesses slightly less than such initial depth. However, in an installed condition, as shown in FIG. 4, the elements span the entire widths of their grooves, which are several times wider than their depth, and thereby exert sealing pressure over a substantial area. As a result, the seal 10 is especially adapted to accommodate surface irregularities on the parts to be sealed.

The seal is intended to be installed between a pair of mating flanges, such as flanges 36 and 38, illustrated in FIGS. 3 and 4 with planar surfaces. Such flanges might, for example, be found in a pipeline system and are capable of being forceably brought together into sealing relationship by bolts 40.

As the flanges 36 and 38 are brought together with the seal 10 therebetween, the opposing flange faces first contact the resistible deformable ridges 18 and 20 to confine the elements 14a and b within their grooves 22a and b. As further force is applied, the ridges flatten out and, in the case of the illustrative embodiment, enable the sealing elements to contact their respective flange faces. The seal 10 is shown at this stage of installation in FIG. 3.

As is apparent from FIGS. 2 and 3, this flattening of the ridges 18 and 20 results in the voids of the grooves 22a and b being progressively reduced. As this occurs, the elements 14a and b deform laterally and begin to fill the voids of the grooves.

This progressive sizing of the grooves 22a and b to the elements 14a and b continues as further force is applied to the flanges 36 and 38. When the grooves are substantially filled, as in FIG. 4, greatly increased resistance to further flattening is encountered. This follows from the fact that the sealing elements are formed of an incompressible material. By virtue of this material being confined within the grooves, cold flow is precluded, yet the sealing elements 14a and b bear a portion of the load applied by the flanges 36 and 38. Installation is thus completed and high-pressure sealing is achieved.

Since the grooves 22a and b afforded by the retainer 12 are volumetrically sized to the sealing elements 14a and b during installation of the seal, it will be appreciated that there is no need to hold the parts to close tolerances during manufacture. On the contrary, the void of each groove need only be larger than the volume of its corresponding element. Then, during installation, the groove void is progressively reduced until it substantially equals the volume of its element. This is an important feature of the seal of the invention and enables it to be mass produced at low cost, yet to achieve effective sealing in high pressure applications.

Assuming that, as is desired, the ridges have some spring-back capability, the retainer is, in effect, preloaded. The ridges 28 and 18 as well as the sealing elements 14a and b, respond to considerable flange separation to maintain confinement and effective sealing.

While the seal 10 has been described as a "two-sided" seal for use between a pair of mating parts, it is to be understood that it might also be constructed for sealing against a single surface. In such case, the retainer member is shaped to provide only one groove and it is simply welded or otherwise secured on the side opposite the groove to a cover for a container or the like. In such instance, a single sealing element is provided.

In some applications it may be desirable for various reasons, including especially good resistance to caustic chemicals and ability to withstand high temperatures, to employ as the sealing element materials which have no appreciable resilience. In this embodiment, the memory of the sealing material cannot be relied on to enhance sealing. Typical of these materials are the fluorocarbon plastics. A seal 50 with deformable sealing elements 52a and b formed of such a material is illustrated in FIG. 5. The elements 52a and b initially span the entire widths of their respective grooves 22a and b.

Installation of the seal 50 of FIG. 5 takes place in the same manner as previously described. However, in this instance, there is no contact between the sealing elements 52a and b and the surfaces of the flanges 36 and 38 until just prior to completion of the installation procedure. In other words, the ridges 18 and 20 must approach their final flattening before such contact takes place. In the installed condition, the seal 50 has the appearance of that illustrated in FIGS. 1 and 2 and would be as shown in FIG. 4.

Still another seal 60 constructed in accordance with the invention is illustrated in FIG. 6 and in a fully installed condition in FIG. 7. The seal 60 differs from the seal 10 previously described only with regard to the construction of its retainer. The ridges 64 and 66 are formed separately from the web 68 and are here shown as secured to the opposite faces of the latter. Each of the ridges 64 and 66 has, in cross section, a pair of web-engaging sections 70 integrally joined by a C-shaped section 72 forming a loop.

The ridges 64 and 66 flatten out during installation, as illustrated in FIG. 7, and as with the previous embodiments, the voids of the grooves 22a and b are progressively reduced until they are substantially equal to the volumes of the respective sealing elements 14a and b. Confinement of the sealing elements is thus achieved by the ridges 64 and 66 and effective, high-pressure sealing results.

While certain embodiments of the invention have been illustrated and described in detail, it will be understood that this was only by way of example and that various changes in the shapes, relative sizes and arrangements of the parts may be made without departing from the spirit and scope of the invention.

I claim:

1. A seal comprising:
   a ringlike sheet metal retainer having a central, generally planar, annular web and two sets of spaced, sheet metal ridge means on opposite sides of said retainer extending along and connected to both edges of said web to cooperate with said web in defining oppositely opening grooves of preselected initial cross-sectional areas in the opposite sides of said retainer;
   said ridge means being resistibly deformable in response to clamping of said retainer between two parts to be sealed and operable in response to clamping force on said ridge means to reduce the cross-sectional areas of the associated grooves progressively from said initial areas to lesser areas; and two deformable sealing elements disposed in said grooves between the associated ridge means in substantially back-to-back relation and having cross-sectional areas less than said initial areas and substantially equal to said lesser areas, whereby deformation of said ridge means to reduce said grooves to said lesser areas causes said sealing elements to substantially fill said grooves and be pressed into continuous sealing engagement with the parts to be sealed as an incident to clamping of the seal between the parts.

2. A seal as defined in claim 1, wherein said retainer and said ridge means are thin sheet metal and define shallow grooves several times wider than the depths of the grooves, and said sealing elements are thin and flat annular bands of said deformable material having edges adjacent said ridge means, flat bottom sides against said web, and flat sealing sides facing out of said grooves for engagement with the parts to be sealed.

3. A seal as defined in claim 2, wherein said bands are of approximately the same thickness as the initial depths of said grooves.

4. A seal as defined in claim 3, wherein the thickness of said bands is less than the initial depth of said grooves.

5. A seal comprising:
a ringlike sheet metal retainer having a center hole and a generally planar annular web extending around said hole, said web having oppositely facing substantially flat sides, and two sets of sheet metal ridges integral with said web deformed in opposite directions from the plane of the web along the edges of the web to cooperate with the latter in defining two oppositely opening and substantially back-to-back annular grooves in the opposite sides of said retainer, each of said grooves having a preselected initial cross-sectional area and a width several times greater than the depth of the groove; and
two sealing elements in the form of flat annular bands of deformable material having thicknesses approximately equal to said depths and cross-sectional areas less than said initial areas, and being disposed in said grooves with the edges of the elements adjacent said ridges, said ridges being deformable under clamping forces tending to flatten said retainer and being shaped to reduce the said initial area to a lesser area during deformation thereby to conform the volume of each groove substantially to the volume of the sealing element therein during clamping of the seal between two parts to be sealed, and to press said sealing elements against the parts across the full widths of the grooves.

6. A seal comprising:
a ringlike retainer including an annular web having a surface on one side adapted to be disposed in opposed relation with a part to be sealed, and spaced ridge means on said one side of said retainer extending along and connected to opposite edges of said web and cooperating therewith in defining a groove of preselected initial cross-sectional area on said one side;
said ridge means being resistibly deformable in response to clamping of said retainer with a normal sealing force against the part to be sealed and operable during deformation to reduce the area of said groove progressively from said initial area to a lesser cross-sectional area; and
a deformable sealing element disposed in said groove between said ridge means and against said web, said sealing element having a cross-sectional area less than said initial area and substantially equal to said lesser area to fit between said ridge means and be disposed fully within said groove prior to deformation of said ridge means whereby clamping of said retainer against the part to be sealed deforms said ridge means to reduce the cross-sectional area of said groove substantially to the area of said sealing element to urge the latter into continuous sealing engagement with the part as an incident to such clamping.

7. A seal as in claim 6, wherein said retainer is formed of thin sheet material and said ridge means are ridges composed of similar sheet material secured to the edges of said web.

8. A seal as in claim 6, wherein said web and said ridge means are composed of thin sheet metal and said sealing element is a flat band of deformable material thinner than the initial depth of said groove to be deformed away from said web and into sealing engagement with said one part as said ridge means reduce the width of said groove during such deformation.

9. A seal as in claim 7, wherein said web is generally planar and said ridge means are formed integrally with said web and offset from the plane thereof.

10. A seal as in claim 7, wherein said web is generally planar and said ridge means are separate parts of similar sheet material attached to the edges of said web.

11. A seal as in claim 6, wherein said retainer has second resistably deformable ridge means on the opposite side thereof defining a second oppositely opening groove and a second deformable sealing element disposed in said second groove to seal in a similar manner.

12. A seal as in claim 11, wherein said retainer is composed of thin sheet metal and said web is a substantially planar ringlike element, said ridge means being hollow loops of sheet metal extending along the edges of said web and each forming two ridges extending in opposite directions from one edge of said web to form corresponding sides of said grooves.

13. A seal as in claim 12, wherein said loops are integral with said web.

14. A seal as in claim 12, wherein said loops are separate parts attached to the edges of said web.

15. A seal as in claim 11, wherein said web is a generally, planar ringlike element and said grooves are continuous and in substantially back-to-back relation, said sealing elements comprising flat continuous bands of said deformable material having edges adjacent said ridge means and substantially flat surfaces for sealing engagement across the full widths of said grooves.

16. A seal as in claim 15, wherein the thicknesses of said sealing elements are less than the initial depths of said grooves.

17. A seal as in claim 15, wherein said retainer and said ridges are composed of thin sheet metal having a resistance to deformation greater than the resistance of said deformable material.

PO-1050
(5/69)

UNITED STATES PATENT OFFICE
CERTIFICATE OF CORRECTION

Patent No. __3,542,382__    Dated __November 24, 1970__

Inventor(s) __Foster M. Hagmann__

It is certified that error appears in the above-identified patent and that said Letters Patent are hereby corrected as shown below:

In the Summary of the Invention:

Column 1, line 61, before "ridges" insert

--means forming--.

line 62, before "ridges" delete

"means forming".

line 71, delete "resistible" and insert therefor --resistibly--.

In the Description of Preferred Embodiment:

Column 4, line 7, delete "ridges 28 and 18" and insert therefor --ridges 18 and 20-

Signed and sealed this 20th day of July 1971.

(SEAL)
Attest:

EDWARD M. FLETCHER, JR.   WILLIAM E. SCHUYLER, JR.
Attesting Officer         Commissioner of Patents